(12) United States Patent  
Chiu et al.

(10) Patent No.: US 8,054,658 B2
(45) Date of Patent: Nov. 8, 2011

(54) CONVERTIBLE CHARGE-PUMP CIRCUIT FOR GENERATING OUTPUT VOLTAGE LEVEL ACCORDING TO VOLTAGE LEVEL SELECTED FROM PREDETERMINED VOLTAGE AND POTENTIAL DIFFERENCE STORED IN CHARGING CAPACITOR AND METHOD THEREOF

(75) Inventors: Ming-Cheng Chiu, Tainan County (TW); Chin-Feng Hsu, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 513 days.

(21) Appl. No.: 12/246,484

(22) Filed: Oct. 6, 2008

(65) Prior Publication Data

US 2010/0085786 A1 Apr. 8, 2010

(51) Int. Cl.
*H02M 3/18* (2006.01)
*H02M 7/00* (2006.01)
*H02M 3/06* (2006.01)

(52) U.S. Cl. .................. 363/59; 363/60; 363/61; 363/62

(58) Field of Classification Search ............... 363/59–62
See application file for complete search history.

(56) References Cited

U.S. PATENT DOCUMENTS

| 6,411,531 B1 * | 6/2002 | Nork et al. | 363/60 |
| 6,920,055 B1 * | 7/2005 | Zeng et al. | 363/59 |
| 2007/0091655 A1 * | 4/2007 | Oyama et al. | 363/59 |
| 2007/0139982 A1 * | 6/2007 | Ueno et al. | 363/59 |

\* cited by examiner

*Primary Examiner* — Matthew Nguyen
*Assistant Examiner* — Gary Nash
(74) *Attorney, Agent, or Firm* — Winston Hsu; Scott Margo

(57) ABSTRACT

A convertible charge-pump circuit includes: a charging circuit having a plurality of charging capacitors and a pumping circuit having an output port coupled to a pumping capacitor. The charging circuit is configured for charging the charging capacitors to store a plurality of potential differences, respectively, when the convertible charge-pump circuit is in a charging phase. The pumping circuit is configured for selecting at least one charging capacitor from the charging capacitors charged in the charging phase to generate an output voltage level at the output port according to a potential difference stored in the selected charging capacitor when the convertible charge-pump circuit is in a pumping phase.

7 Claims, 6 Drawing Sheets

US 8,054,658 B2

CONVERTIBLE CHARGE-PUMP CIRCUIT FOR GENERATING OUTPUT VOLTAGE LEVEL ACCORDING TO VOLTAGE LEVEL SELECTED FROM PREDETERMINED VOLTAGE AND POTENTIAL DIFFERENCE STORED IN CHARGING CAPACITOR AND METHOD THEREOF

BACKGROUND OF THE INVENTION

1. Field of the Invention

The present invention relates to a charge-pump circuit, and more particularly, to a charge-pump circuit having a convertible discharging path.

2. Description of the Prior Art

A charge-pump circuit is utilized for generating a required output voltage, and is one of the most important elements in a displaying apparatus. Please refer to FIG. 1. FIG. 1 is a diagram illustrating a conventional charge-pump circuit 100. The charge-pump circuit 100 includes a first input switch $SW_1$, a second input switch $SW_2$, a first output switch $SW_3$, a second output switch $SW_4$, a charging capacitor $C_1$, and a pumping capacitor $C_2$. A node $N_1$ of the first input switch $SW_1$ receives the input voltage $V_i$, and a node $N_2$ of the second input switch $SW_2$ is coupled to a first ground reference voltage $V_{g1}$. The charging capacitor $C_1$ is coupled between nodes $N_3$ and $N_4$, and the pumping capacitor $C_2$ is coupled between nodes $N_5$ and $N_6$, in which the node $N_5$ is utilized for outputting the output voltage $V_o$ and the node $N_6$ is coupled to a second ground reference voltage $V_{g2}$. Furthermore, the first output switch $SW_3$ is coupled between the nodes $N_3$ and $N_5$, and the second output switch $SW_4$ is coupled between the nodes $N_4$ and $N_6$.

According to the conventional charge-pump circuit 100, when the first input switch $SW_1$ and the second input switch $SW_2$ are switched on, the electric charge corresponding to the voltage difference between the input voltage $V_i$ and the first ground reference voltage $V_{g1}$ is charged to the charging capacitor $C_1$. Meanwhile, the first output switch $SW_3$ and the second output switch $SW_4$ are switched off. Then, the first output switch $SW_3$ and the second output switch $SW_4$ are switched on to pump the electric charge to the pumping capacitor $C_2$. By appropriately setting the second ground reference voltage $V_{g2}$, the output voltage $V_o$ that is required in the displaying circuit can be generated.

In general, each charge-pump circuit is only able to generate a specific output voltage. When different output voltages are required in the displaying apparatus, a plurality of charge-pump circuits are needed. The charging capacitor $C_1$ and the pumping capacitor $C_2$ in the charge-pump circuit occupy a large area and significantly increase the cost of the charge-pump circuit. Therefore, lowering the occupied area and cost of each charge-pump circuit is an urgent problem in this field.

SUMMARY OF THE INVENTION

One of the objectives of the present invention is to provide a convertible charge pump having a convertible discharging path, and a method thereof.

According to an embodiment of the present invention, a convertible charge-pump circuit is disclosed. The convertible charge-pump circuit comprises a charging circuit having a plurality of charging capacitors and a pumping circuit having an output port coupled to a pumping capacitor. The charging circuit is configured for charging the charging capacitors to store a plurality of potential differences, respectively, when the convertible charge-pump circuit is in a charging phase. The pumping circuit is configured for selecting at least one charging capacitor from the charging capacitors charged in the charging phase to generate an output voltage level at the output port according to a potential difference stored in the selected charging capacitor(s) when the convertible charge-pump circuit is in a pumping phase.

According to another embodiment of the present invention, a method of controlling a convertible charge-pump circuit for generating an output voltage at an output port coupled to a pumping capacitor is disclosed. The method of controlling the convertible charge-pump circuit comprises the steps of: when the convertible charge-pump circuit is in a charging phase, charging a plurality of charging capacitors to store a plurality of potential differences, respectively; and when the convertible charge-pump circuit is in a pumping phase, selecting at least one charging capacitor from the charging capacitors charged in the charging phase to generate the output voltage level at the output port according to a potential difference stored in the selected charging capacitor(s).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
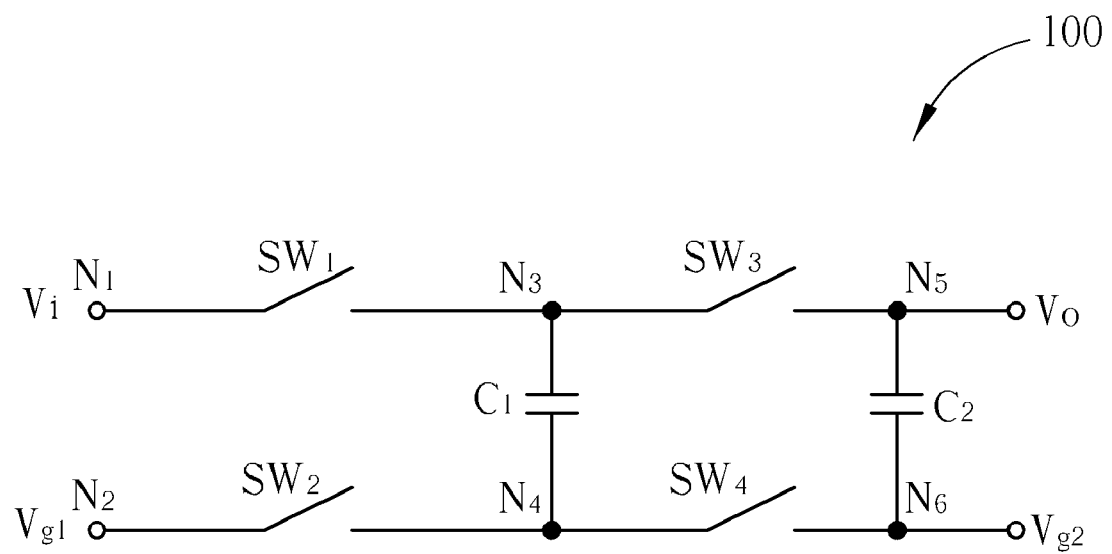
FIG. 1 is a diagram illustrating a conventional charge-pump circuit.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Different features of the present invention are detailed as below in reference to the figures, and for convenience of explanation, the same elements in separate figures are indicated by the same reference numerals.

Figure 2:
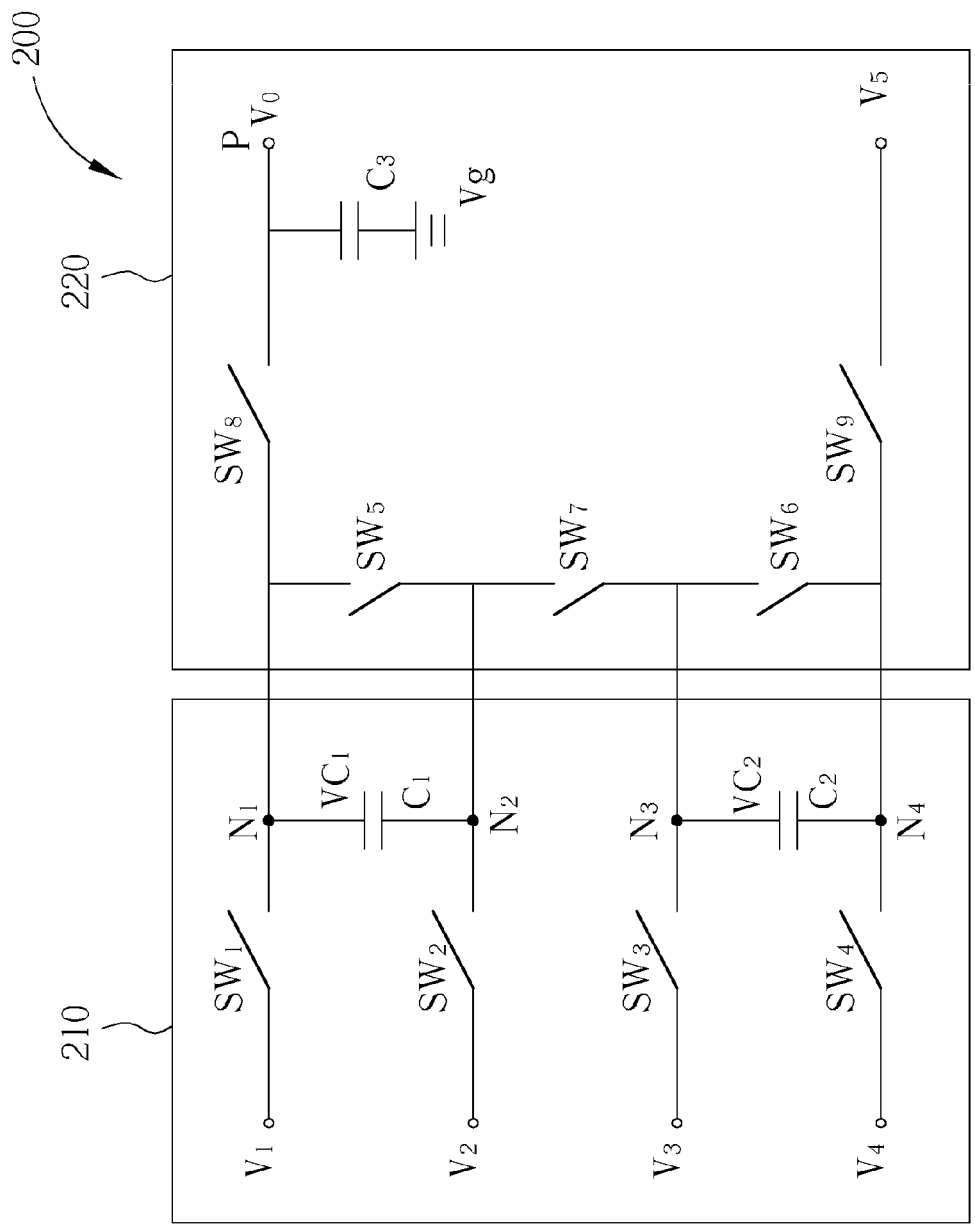
FIG. 2 is a diagram illustrating a convertible charge-pump circuit according to a preferred embodiment of the present invention.

Please refer to FIG. 2. FIG. 2 is a diagram illustrating a convertible charge-pump circuit 200 according to a preferred embodiment of the present invention. The convertible charge-pump circuit 200 comprises a charging circuit 210 and a pumping circuit 220. The charging circuit 210 comprises a first charging capacitor $C_1$, a second charging capacitor $C_2$, a first charging switch $SW_1$, a second charging switch $SW_2$, a third charging switch $SW_3$ and a fourth charging switch $SW_4$. The pumping circuit 220 comprises a first controlling switch $SW_5$, a second controlling switch $SW_6$, a coupling switch $SW_7$, a first pumping switch $SW_8$, a second pumping switch $SW_9$ and a pumping capacitor $C_3$. In the charging circuit 210, the first charging switch $SW_1$ is coupled between a first voltage level $V_1$ and a first node $N_1$ of the first charging capacitor $C_1$; the second charging switch $SW_2$ is coupled between a second voltage level $V_2$ and a second node $N_2$ of the first charging capacitor $C_1$; the third charging switch $SW_3$ is coupled between a third voltage level $V_3$ and a first node $N_3$ of the second charging capacitor $C_2$; and the fourth charging switch $SW_4$ is coupled between a fourth voltage level $V_4$ and a second node $N_4$ of the second charging capacitor $C_2$. In the pumping circuit 220, the first controlling switch $SW_5$ is coupled to the first charging capacitor $C_1$ in parallel; the second controlling switch $SW_6$ is coupled to the second charging capacitor $C_2$ in parallel; the coupling switch $SW_7$ is coupled between the second node $N_2$ of the first charging capacitor $C_1$ and the first node $N_3$ of the second charging capacitor $C_2$; the first pumping switch $SW_8$ is coupled between the first node $N_1$ of the first charging capacitor $C_1$ and an output port P; the second pumping switch $SW_9$ is coupled between the second node $N_4$ of the second charging capacitor $C_2$ and a predetermined voltage level $V_5$; and the pumping capacitor $C_3$ is coupled between the output port P and a ground voltage level Vg. When the convertible charge-pump circuit 200 is in a charging phase, the charging circuit 210 is configured for charging the charging capacitors $C_1$, $C_2$ to store potential differences, respectively. When the convertible charge-pump circuit 200 is in a pumping phase, the pumping circuit 220 is configured for selecting at least one capacitor from the charging capacitors $C_1$, $C_2$ charged in the charging phase to generate an output voltage level Vo at the output port P according to a potential difference stored in the charging capacitor(s). Further description of the convertible charge-pump circuit 200 is detailed as follows.

Figure 3:
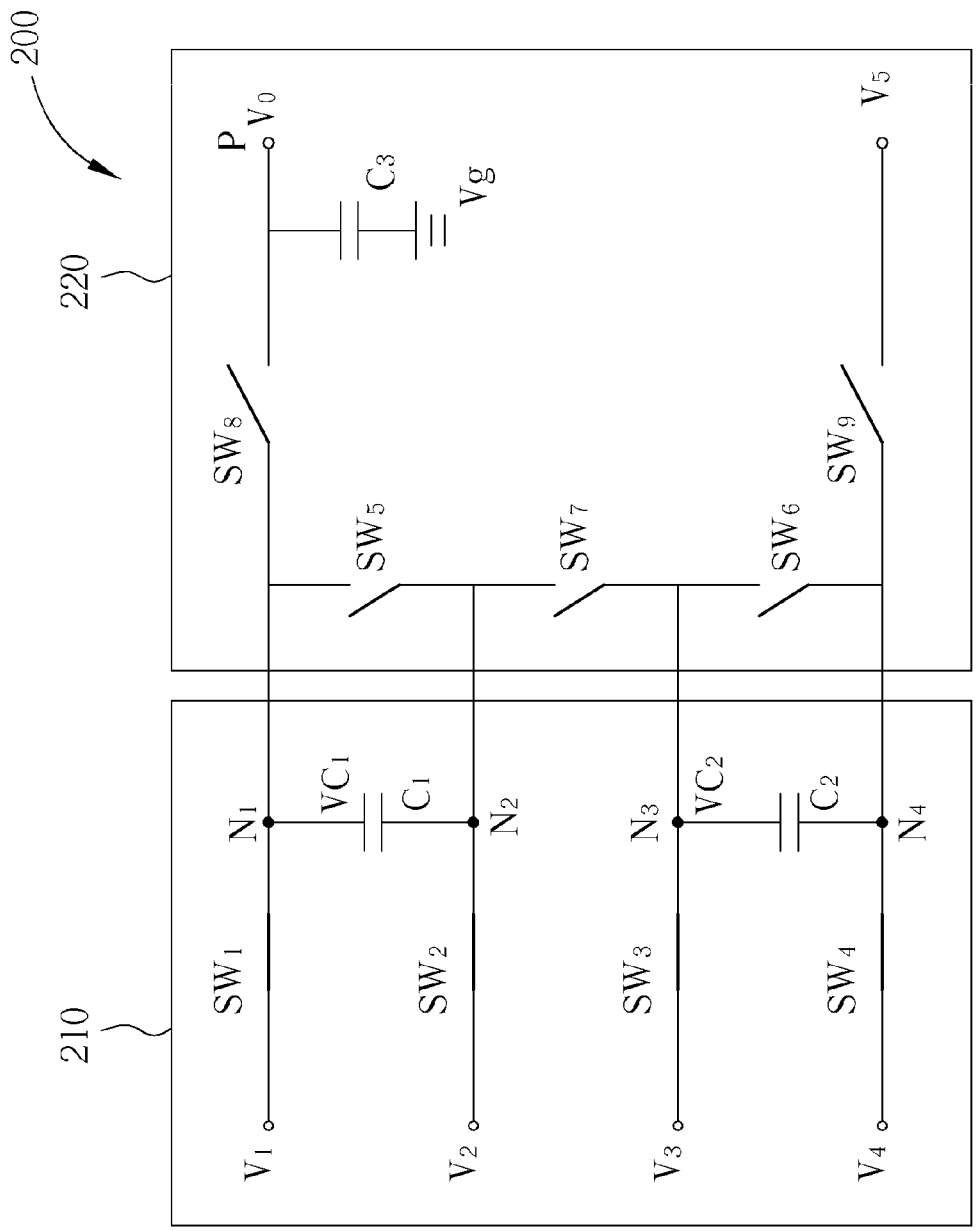
FIG. 3 is a diagram illustrating a state of each switch of the convertible charge-pump circuit shown in FIG. 2 in the charging phase.

Please refer to FIG. 3. FIG. 3 is a diagram illustrating a state of each switch of the convertible charge-pump circuit 200 in the charging phase. As shown in FIG. 3, in the charging phase, the first controlling switch $SW_5$, the second controlling switch $SW_6$, the coupling switch $SW_7$, the first pumping switch $SW_8$ and the second pumping switch $SW_9$ are all switched off; and the first charging switch $SW_1$, the second charging switch $SW_2$, the third charging switch $SW_3$ and the fourth charging switch $SW_4$ are all switched on. The first charging switch $SW_1$ and the second charging switch $SW_2$ are switched on to charge the first charging capacitor $C_1$ to a first potential difference $VC_1$, and the third charging switch $SW_3$ and the fourth charging switch $SW_4$ are switched on to charge the second charging capacitor $C_2$ to a second potential difference $VC_2$. The first potential difference $VC_1$ is based on the first voltage level $V_1$ and the second voltage level $V_2$, and the second potential difference $VC_2$ is based on the third voltage level $V_3$ and the fourth voltage level $V_4$. In actuality, the first potential difference $VC_1$ is approximately equal to the difference between the first and second potential differences $V_1$, $V_2$ (i.e., $VC_1=V_1-V_2$), and the second potential difference $VC_2$ is approximately equal to the difference between the third and fourth potential differences $V_3$, $V_4$ (i.e., $VC_1=V_3-V_4$).

Figure 4:
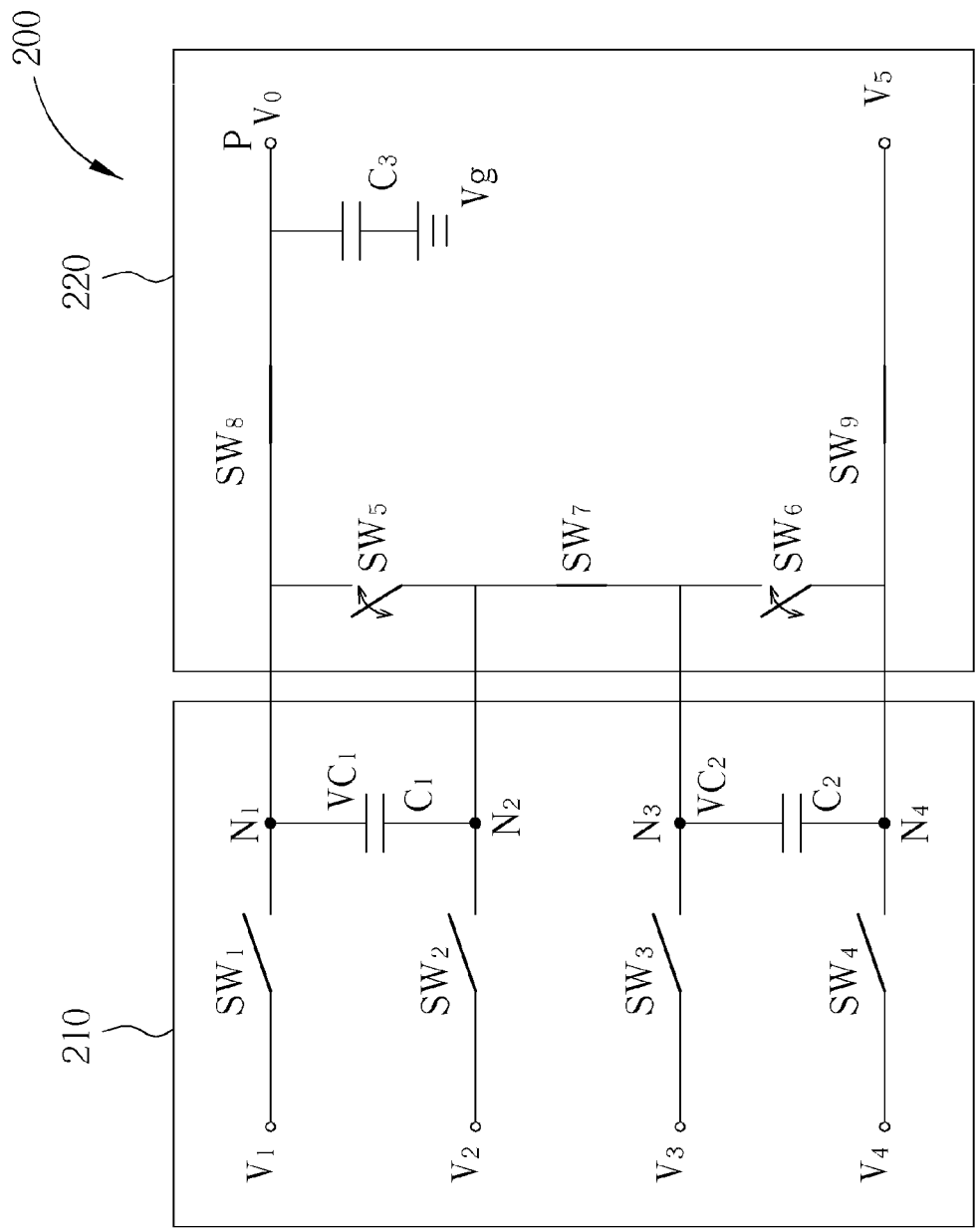
FIG. 4 is a diagram illustrating a state of each switch of the convertible charge-pump circuit shown in FIG. 2 in the pumping phase.

Please refer to FIG. 4. FIG. 4 is a diagram illustrating a state of each switch of the convertible charge-pump circuit 200 in the pumping phase. As shown in FIG. 4, under the pumping phase, the first charging switch $SW_1$, the second charging switch $SW_2$, the third charging switch $SW_3$, the fourth charging switch $SW_4$ are all switched off; the coupling switch $SW_7$, the first pumping switch $SW_8$ and the second pumping switch $SW_9$ are all switched on; and at least one of the first controlling switch $SW_5$ and the second controlling switch $SW_6$ is switched off. If the first controlling switch $SW_5$ and the second controlling switch $SW_6$ are both switched off, the output voltage level Vo is equal to $(V_5+VC_2+VC_1)$; if the first controlling switch $SW_5$ is switched off and the second controlling switch $SW_6$ is switched on, the output voltage level Vo is equal to $(V_5+VC_1)$; and if the first controlling switch $SW_5$ is switched on and the second controlling switch $SW_6$ is switched off, the output voltage level Vo is equal to $(V_5+VC_2)$. Consequently, the first potential difference $VC_1$ can be removed from the output voltage level Vo by switching on the first controlling switch $SW_5$, and the second potential difference $VC_2$ can be removed from the output voltage level Vo by switching on the second controlling switch $SW_6$. In brief, the output voltage level Vo can be controlled by switching the first controlling switch $SW_5$ and the second controlling switch $SW_6$.

Please note that, in the above embodiment, the convertible charge-pump circuit 200 comprises two charging capacitors (i.e., $C_1$, $C_2$), two controlling switches (i.e., $SW_5$, $SW_6$) and one coupling switch (i.e., $SW_7$); however, this is only for illustrative purposes and not a limitation of the present invention. In practice, the convertible charge-pump circuit of the present invention may have more charging capacitors, controlling switches and coupling switches and the number of the charging capacitors, controlling switches and coupling switches are dependent on design requirements. For example, in another embodiment of the present invention, the convertible charge-pump circuit comprises three charging capacitors for storing three potential differences; three controlling switches coupled to the three charging capacitors in parallel, respectively, for controlling whether to remove the corresponding potential difference from the output voltage level; and two coupling switches coupled between two of the controlling switches, respectively.

With the help of the controlling switches and coupling switches, the convertible charge-pump circuit of the present invention has capability to output different output voltage levels. Thus, only a convertible charge-pump circuit of the present invention is needed when different output voltages are required in a displaying apparatus, so the plurality of charge-pump circuits that are required in the conventional displaying apparatus are not necessary. Compared with the prior art, the cost and area of the displaying apparatus can be significantly decreased.

Figure 5:
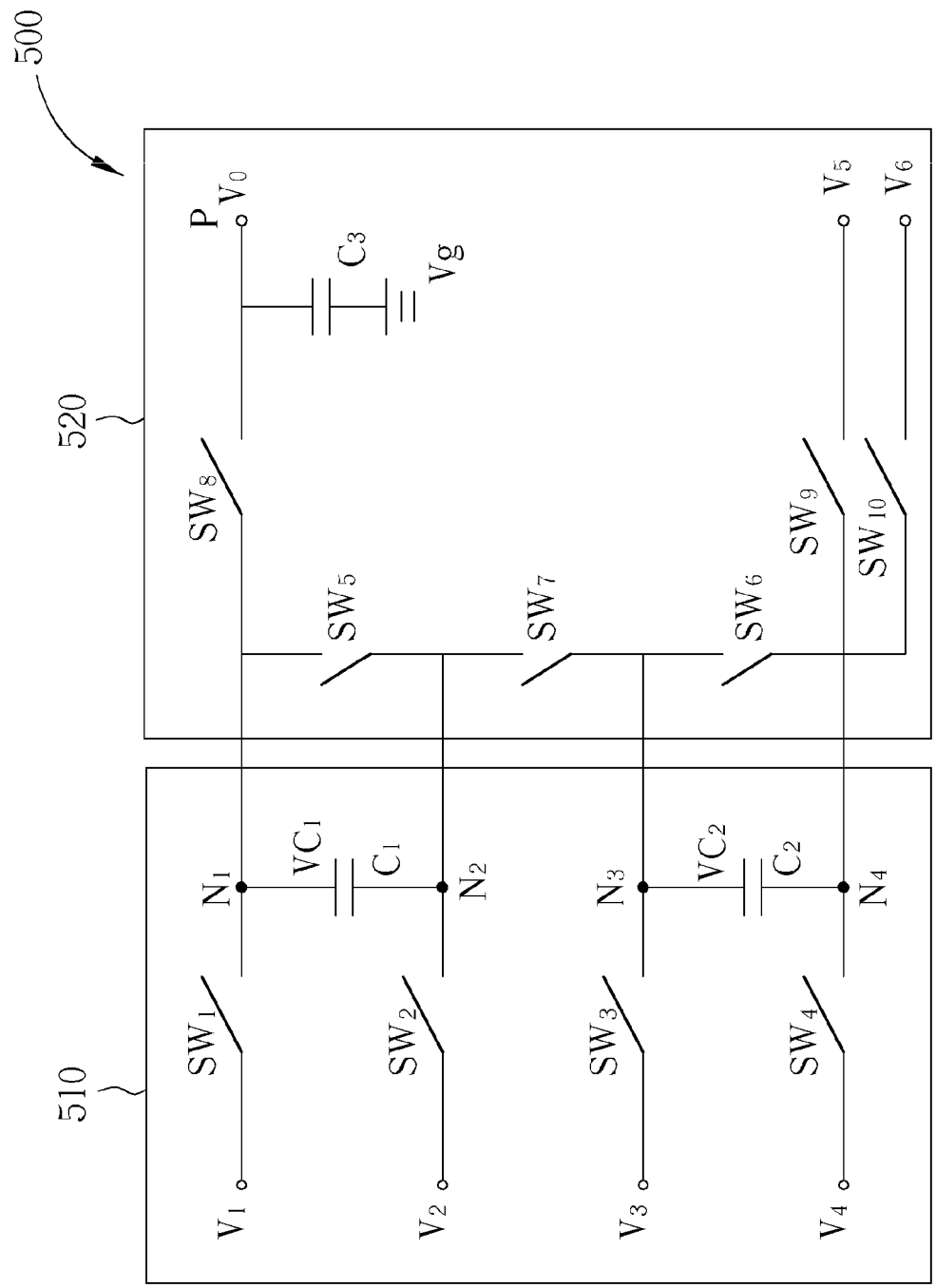
FIG. 5 is a diagram illustrating a convertible charge-pump circuit according to an exemplary embodiment of the present invention.

In another embodiment of the present invention, the convertible charge-pump circuit of the present invention may comprise a plurality of second pumping switches that are coupled to a plurality of predetermined voltage levels, respectively, for selecting a voltage level from the predetermined voltage levels to determine the output voltage level. Please refer to FIG. 5. FIG. 5 is a diagram illustrating a convertible charge-pump circuit 500 according to an exemplary embodiment of the present invention. In this exemplary embodiment, the convertible charge-pump circuit 500 comprises a charging circuit 510 and a pumping circuit 520. Because the structure and operation of the charging circuit 510 is the same as that of the charging circuit 210, further description about the charging circuit 510 is omitted here for brevity. In addition, because the structure and operation of the pumping circuit 520 is similar to that of the pumping circuit 220, only different features of the pumping circuit 520 from the pumping circuit 220 are detailed here for simplicity.

As shown in FIG. 5, the pumping circuit 520 comprises two second pumping switches $SW_9$, $SW_{10}$. The second pumping switch $SW_9$ is coupled between the second node $N_4$ of the second charging capacitor $C_2$ and the predetermined voltage level $V_5$. The second pumping switch $SW_{10}$ is coupled between the second node $N_4$ of the second charging capacitor $C_2$ and a predetermined voltage level $V_6$. In the charging phase, the second pumping switches $SW_9$, $SW_{10}$ are both switched off. In the pumping phase, either the second pumping switch $SW_9$ or the second pumping switch $SW_{10}$ are switched on for coupling either the predetermined voltage level $V_5$ or the predetermined voltage level $V_6$ to the second node $N_4$ of the second charging capacitor $C_2$. If the second pumping switch $SW_9$ is switched on and the second pumping switch $SW_{10}$ is switched off, the output voltage level Vo of the pumping circuit 520 is determined according to the predetermined voltage level $V_5$, similar to the pumping circuit 220. On the other hand, if the second pumping switch $SW_9$ is switched off and the second pumping switch $SW_{10}$ is switched on, the output voltage level Vo of the pumping circuit 520 is determined according to the predetermined voltage level $V_6$. The output voltage levels Vo of the convertible charge-pump circuit 500 in the pumping mode with different switch combinations is shown in Table 1 as below:

TABLE 1

| $SW_9$ | $SW_{10}$ | $SW_5$ | $SW_6$ | Vo |
|---|---|---|---|---|
| on | off | off | off | $V_5 + VC_2 + VC_1$ |
| on | off | off | on | $V_5 + VC_1$ |
| on | off | on | off | $V_5 + VC_2$ |
| off | on | off | off | $V_6 + VC_2 + VC_1$ |
| off | on | off | on | $V_6 + VC_1$ |
| off | on | on | off | $V_6 + VC_2$ |

As can be seen from Table 1, the output voltage level Vo of the convertible charge-pump circuit 500 can be controlled by switching the first controlling switch $SW_5$, the second controlling switch $SW_6$ and the second switches $SW_9$, $SW_{10}$.

Please note that, in the above embodiment, the convertible charge-pump circuit 500 comprises two second switches (i.e., $SW_9$, $SW_{10}$) coupled to two predetermined voltage levels (i.e., $V_5$, $V_6$) correspondingly; however, this is only for illustrative purposes and not a limitation of the present invention. In practice, the convertible charge-pump circuit of the present invention may have more second switches coupled to predetermined voltage levels correspondingly and the number of the second switches is dependent on design requirements. For example, in another embodiment of the present invention, the convertible charge-pump circuit comprises three second switches, which are coupled between the second node $N_4$ of the second charging capacitor $C_2$ and three predetermined voltage levels correspondingly for selecting a voltage level from the three predetermined voltage levels to determine the output voltage level of the convertible charge-pump circuit.

Figure 6:
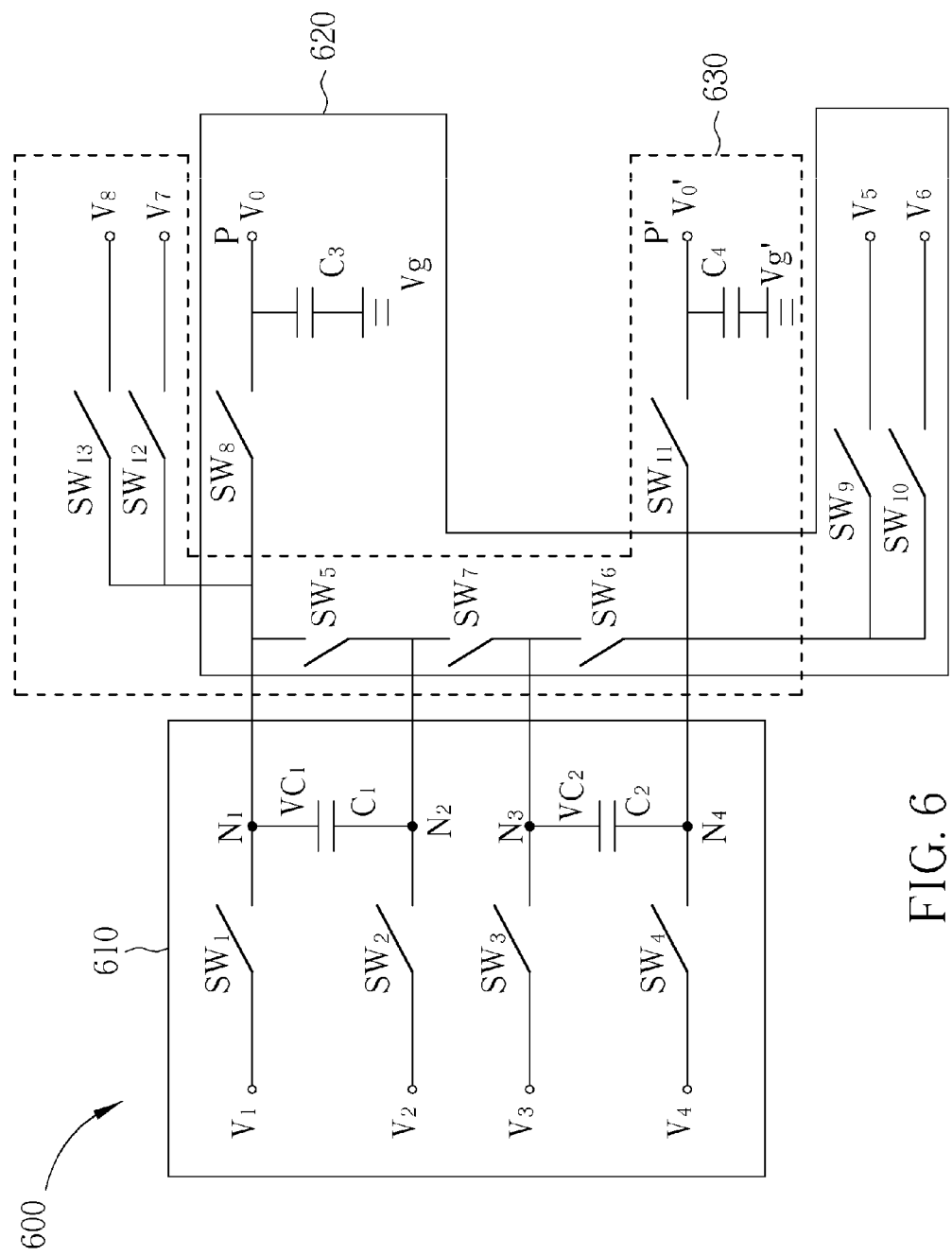
FIG. 6 is a diagram illustrating a convertible charge-pump circuit according to an exemplary embodiment of the present invention.

In another embodiment of the present invention, the convertible charge-pump circuit may comprise two pumping circuits to generate two output voltage levels, and the two pumping circuits share one charging circuit. Please refer to FIG. 6. FIG. 6 is a diagram illustrating a convertible charge-pump circuit 600 according to an exemplary embodiment of the present invention. In this exemplary embodiment, the convertible charge-pump circuit 600 comprises a charging circuit 610, a first pumping circuit 620 and a second pumping circuit 630. Because the structure and operation of the charging circuit 610 is the same as that of the charging circuit 210, further description about the charging circuit 610 is omitted here for brevity. In addition, because the structure and operation of the first pumping circuit 620 is the same as that of the pumping circuit 520, further descriptions about the first pumping circuit 620 is also omitted here for brevity.

As shown in FIG. 6, the second pumping circuit 630 comprises the first controlling switch $SW_5$, the second controlling switch $SW_6$, the coupling switch $SW_7$, a first pumping switch $SW_{11}$, second pumping switches $SW_{12}$, $SW_{13}$ and a pumping capacitor $C_4$. To put it more concretely, the second pumping circuit 630 shares the first controlling switch $SW_5$, the second controlling switch $SW_6$ and the coupling switch $SW_7$ with the first pumping circuit 620. In the second pumping circuit 630, the first pumping switch $SW_{11}$ is coupled between the second node $N_4$ of the second charging capacitor $C_2$ and an output port P'; the second pumping switch $SW_{12}$ is coupled between the first node $N_1$ of the first charging capacitor $C_1$ and a predetermined voltage level $V_7$; the second pumping switch $SW_{13}$ is coupled between the first node $N_1$ of the first charging capacitor $C_1$ and a predetermined voltage level $V_8$; and the pumping capacitor $C_4$ is coupled between the output port P' and a ground voltage level Vg'. Since the operation of the second pumping circuit 630 is similar to that of the first pumping circuit 620, further descriptions about the second pumping circuit 630 are omitted here for brevity. The output voltage levels Vo' of the second pumping circuit 630 in the pumping mode with different switch combinations is shown in Table 2 as below:

TABLE 2

| $SW_{12}$ | $SW_{13}$ | $SW_5$ | $SW_6$ | Vo |
|---|---|---|---|---|
| on | off | off | off | $V_7 + VC_2 + VC_1$ |
| on | off | off | on | $V_7 + VC_1$ |
| on | off | on | off | $V_7 + VC_2$ |
| off | on | off | off | $V_8 + VC_2 + VC_1$ |
| off | on | off | on | $V_8 + VC_1$ |
| off | on | on | off | $V_8 + VC_2$ |

As can be seen from Table 2, the output voltage level Vo' of the convertible charge-pump circuit 600 can be controlled by switching the first controlling switch $SW_5$, the second controlling switch $SW_6$ and the second switches $SW_{12}$, $SW_{13}$.

Those skilled in the art will readily observe that numerous modifications and alterations of the device and method may be made while retaining the teachings of the invention.

What is claimed is:

1. A convertible charge-pump circuit, comprising:
   a charging circuit, having a plurality of charging capacitors, for charging the charging capacitors to store a plurality of potential differences, respectively, when the convertible charge-pump circuit is in a charging phase; and
   a pumping circuit, having an output port coupled to a pumping capacitor, for selecting at least one charging capacitor from the charging capacitors charged in the charging phase to generate an output voltage level at the output port according to a potential difference stored in the charging capacitor when the convertible charge-pump circuit is in a pumping phase;
   wherein the pumping circuit further selects a voltage level from a plurality of predetermined voltage levels, and the output voltage level is determined according to the selected voltage level and the potential difference stored in the charging capacitor.

2. The convertible charge-pump circuit of claim 1, wherein:
the charging circuit comprises:
a first charging capacitor;
a second charging capacitor;
a first charging switch, coupled between a first voltage level and a first node of the first charging capacitor;
a second charging switch, coupled between a second voltage level and a second node of the first charging capacitor;
a third charging switch, coupled between a third voltage level and a first node of the second charging capacitor; and
a fourth charging switch, coupled between a fourth voltage level and a second node of the second charging capacitor;
the pumping circuit comprises:
a first controlling switch, coupled to the first charging capacitor in parallel;
a second controlling switch, coupled to the second charging capacitor in parallel;
a coupling switch, coupled between the second node of the first charging capacitor and the first node of the second charging capacitor;
a first pumping switch, coupled between the first node of the first charging capacitor and the output port; and
at least a second pumping switch, coupled between the second node of the second charging capacitor and a predetermined voltage level; and
wherein:
when the convertible charge-pump circuit is in the charging phase, the first controlling switch, the second controlling switch, the first pumping switch, the second pumping switch and the coupling switch are switched off; the first charging switch and the second charging switch are switched on for charging the first charging capacitor according to the first voltage level and the second voltage level; and the third charging switch and the fourth charging switch are switched on for charging the second charging capacitor according to the third voltage level and the fourth voltage level; and
when the convertible charge-pump circuit is in the pumping phase, the first charging switch, the second charging switch, the third charging switch and the fourth charging switch are switched off; and the first pumping switch, the second pumping switch and the coupling switch are switched on and at least one of the first controlling switch and the second controlling switch are switched off for generating the output voltage level.

3. The convertible charge-pump circuit of claim 2, wherein the pumping circuit comprises a plurality of second pumping switches coupled between the second node of the second charging capacitor and a plurality of predetermined voltage levels;
wherein:
when the convertible charge-pump circuit is in the charging phase, the plurality of second pumping switches are switched off; and
when the convertible charge-pump circuit is in the pumping phase, one of the plurality of second pumping switches is switched on for coupling one of the predetermined voltage levels to the second node of the second charging capacitor.

4. A method of controlling a convertible charge-pump circuit to generate an output voltage at an output port coupled to a pumping capacitor, the method comprising:
when the convertible charge-pump circuit is in a charging phase, charging a plurality of charging capacitors to store a plurality of potential differences respectively; and
when the convertible charge-pump circuit is in a pumping phase, selecting at least one charging capacitor from the charging capacitors charged in the charging phase to generate the output voltage level at the output port according to a potential difference stored in the selected charging capacitor, and selecting a voltage level from a plurality of predetermined voltage levels;
wherein the output voltage level is determined according to the selected voltage level and the potential difference stored in the selected charging capacitor.

5. A convertible charge-pump circuit, comprising:
a charging circuit, having a plurality of charging capacitors, for charging the charging capacitors to store a plurality of potential differences, respectively, when the convertible charge-pump circuit is in a charging phase; and
a pumping circuit, having an output port coupled to a pumping capacitor, for selecting at least one charging capacitor from the charging capacitors charged in the charging phase to generate an output voltage level at the output port according to a potential difference stored in the charging capacitor when the convertible charge-pump circuit is in a pumping phase;
wherein the charging circuit comprises:
a first charging capacitor;
a second charging capacitor;
a first charging switch, coupled between a first voltage level and a first node of the first charging capacitor;
a second charging switch, coupled between a second voltage level and a second node of the first charging capacitor;
a third charging switch, coupled between a third voltage level and a first node of the second charging capacitor; and
a fourth charging switch, coupled between a fourth voltage level and a second node of the second charging capacitor;
the pumping circuit comprises:
a first controlling switch, coupled to the first charging capacitor in parallel;
a second controlling switch, coupled to the second charging capacitor in parallel;
a coupling switch, coupled between the second node of the first charging capacitor and the first node of the second charging capacitor;
a first pumping switch, coupled between the first node of the first charging capacitor and the output port; and
at least a second pumping switch, coupled between the second node of the second charging capacitor and a predetermined voltage level; and
wherein:
when the convertible charge-pump circuit is in the charging phase, the first controlling switch, the second controlling switch, the first pumping switch, the second pumping switch and the coupling switch are switched off; the first charging switch and the second charging switch are switched on for charging the first charging capacitor according to the first voltage level and the second voltage level; and the third charging switch and the fourth charging switch are switched on for charging the second charging capacitor according to the third voltage level and the fourth voltage level; and when the convertible charge-pump circuit is in the pumping phase, the first charging switch, the second charging switch, the third charging switch and the fourth charging switch are switched off; and the first pumping switch, the second pumping switch and the coupling switch are switched on and at least one of the first controlling switch and the second controlling switch are switched off for generating the output voltage level.

6. The convertible charge-pump circuit of claim 5, wherein the pumping circuit further selects a voltage level from a plurality of predetermined voltage levels, and the output voltage level is determined according to the selected voltage level and the potential difference stored in the charging capacitor.

7. The convertible charge-pump circuit of claim 5, wherein the pumping circuit comprises a plurality of second pumping switches coupled between the second node of the second charging capacitor and a plurality of predetermined voltage levels;

wherein:

when the convertible charge-pump circuit is in the charging phase, the plurality of second pumping switches are switched off; and when the convertible charge-pump circuit is in the pumping phase, one of the plurality of second pumping switches is switched on for coupling one of the predetermined voltage levels to the second node of the second charging capacitor.

* * * * *

UNITED STATES PATENT AND TRADEMARK OFFICE
CERTIFICATE OF CORRECTION

PATENT NO. : 8,054,658 B2  
APPLICATION NO. : 12/246484  
DATED : November 8, 2011  
INVENTOR(S) : Ming-Cheng Chiu et al.

Page 1 of 1

It is certified that error appears in the above-identified patent and that said Letters Patent is hereby corrected as shown below:

On the title page, item (54) and at Column 1, lines 1-7, correct the invention title from "CONVERTIBLE CHARGE-PUMP CIRCUIT FOR GENERATING OUTPUT VOLTAGE LEVEL ACCORDING TO VOLTAGE LEVEL SELECTED FROM PREDETERMINED VOLTAGE AND POTENTIAL DIFFERENCE STORED IN CHARGING CAPACITOR AND METHOD THEREOF" to --CONVERTIBLE CHARGE-PUMP CIRCUIT FOR GENERATING OUTPUT VOLTAGE LEVEL ACCORDING TO VOLTAGE LEVEL SELECTED FROM PREDETERMINED VOLTAGE LEVELS AND POTENTIAL DIFFERENCE STORED IN CHARGING CAPACITOR AND METHOD THEREOF--.

Signed and Sealed this  
Third Day of January, 2012

David J. Kappos  
*Director of the United States Patent and Trademark Office*